US006336164B1

(12) United States Patent
Gerdt et al.

(10) Patent No.: US 6,336,164 B1
(45) Date of Patent: Jan. 1, 2002

(54) METHOD AND SYSTEM FOR PREVENTING DEADLOCK IN A LOG STRUCTURED ARRAY

(75) Inventors: Steven Gerdt; Juan Li; Dung Lim Nguyen; Hai-Fang Yun, all of San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/311,205

(22) Filed: May 12, 1999

(51) Int. Cl.⁷ .................................................. G06F 12/14
(52) U.S. Cl. .......................... 711/113; 711/155; 707/206
(58) Field of Search ................................... 711/112, 113, 711/155, 165; 707/206

(56) References Cited

U.S. PATENT DOCUMENTS

| | | | |
|---|---|---|---|
| 4,922,408 A | * 5/1990 | Davis et al. | 709/252 |
| 5,150,463 A | 9/1992 | Ward et al. | 395/200 |
| 5,416,915 A | 5/1995 | Mattson et al. | 395/425 |
| 5,488,701 A | 1/1996 | Brady et al. | 395/182.04 |
| 5,530,850 A | 6/1996 | Ford et al. | 395/600 |
| 5,537,588 A | 7/1996 | Engelmann et al. | 395/600 |
| 5,550,998 A | 8/1996 | Willis et al. | 395/441 |
| 5,551,003 A | 8/1996 | Mattson et al. | 395/463 |
| 5,555,371 A | 9/1996 | Duyanovich et al. | 395/182.11 |
| 5,574,952 A | 11/1996 | Brady et al. | 395/888 |
| 5,802,344 A | * 9/1998 | Menon et al. | 711/165 |

OTHER PUBLICATIONS

IBM Technical Disclosure Bulletin, "Method for Improving the Host I/O Performance During Concurrent Copy", vol. 37, No. 02A, Feb. 1994.
IBM Technical Disclosure Bulletin, "Reducing Data Movement in Log Structure File System Garbage Collection", vol. 38, No. 02, Feb. 1995.

* cited by examiner

Primary Examiner—Kevin L. Ellis
(74) Attorney, Agent, or Firm—Sawyer Law Group LLP; Abdy Raissinia

(57) ABSTRACT

Aspects for preventing deadlock in a log structured array are described. In an exemplary method aspect, and system for providing same, the method includes monitoring available segments to determine when to reserve an open segment, identifying a process type requesting access to the open segment, and limiting access to one process type for the reserved segment. Limiting access further includes limiting access to a garbage collection process.

13 Claims, 3 Drawing Sheets

Cache Oriented Buffered DASD Array

Cache Oriented Buffered DASD Array

METHOD AND SYSTEM FOR PREVENTING DEADLOCK IN A LOG STRUCTURED ARRAY

FIELD OF THE INVENTION

The present invention relates to log structured arrays for storage subsystems, and more particularly to preventing deadlock in log structured arrays.

BACKGROUND OF THE INVENTION

In a storage subsystem, a redundant array of inexpensive disks, RAID, is one solution to I/O (input/output) bottleneck problems. RAID typically increases disk bandwidth through parallelism for accessing data and provides high data availability through redundancy. One problem associated with some levels of RAID is the write penalty; a write operation actually requires two disk reads (of old data and parity) and two disk writes (of updated data and the newly calculated parity). Log Structured Array, (ISA), writes all customer data to disk sequentially in a log-like structure, and enables RAID to support data compression. The amount of compression achieved is dependent on the actual data values. After a piece of data is modified, it may not compress to the same number of bytes and thus will not fit into the space originally allocated to it. This problem is encountered in any storage system that assigns a piece of data to a disk fixed location; LSA avoids this problem, since updated data is written to the end of the log structure.

Through LSA, a logical track, LT, which is the typical unit accessed by I/O programs, is allowed to be updated to a different location on disk. Since the physical address of a logical track changes over time, a directory, called LSA directory, is necessary to keep track of the current LT's physical address on the array. Each directory entry also records the logical track's current length, as this may vary with compression.

The log structured array consists of N+P+S physical disk drives, where N is the number of HDDs' (hard disk drives) worth of physical space available for customer data, P is the number of HDDs' worth of physical space for parity data, and S is the number of HDDs' worth of physical space for spare drives. Each HDD is divided into large consecutive areas called segment columns. Typically, a segment column is as large as a logical cylinder. Corresponding segment columns from the N+P+S HDDs constitute a segment. The array has as many segments as there are segment columns on a HDD disk in the array. An example of the layout for such a system is shown in FIG. 1. In a RAID-5 configuration, one of the segment columns of a segment contains the parity of the remaining data segment columns of the segment.

Referring to FIG. 1, the storage for the partition 52 is arranged as segments 56, where each segment has N data segment columns 58 and one parity segment column 59. The logical tracks 60 are stored within segment columns. A segment directory 62 contains information on each of the logical tracks in the segment which is used during garbage collection and recovery procedures. The segment directory 62 is stored in a small number of sectors out of a segment's total disk space. As shown, the entire segment directory resides in one same segment column in each of the segments. Alternatively, the segment directory can be spread among the devices. In a RAID-5 system, parity is distributed among the devices as shown.

A segment column is defined as an arbitrary number of contiguous physical tracks as described above. Typically it is desirable to define a segment column to be the same size as a logical cylinder. The collection of disk recording areas comprising corresponding segment columns from each of the HDDs forms what is called a segment.

LSA segments are categorized as one of the following types: free, which refers to a segment that contains no valid data; open, which refers to a segment that is available to hold LTs being destaged; closed, which refers to a segment containing some valid data, but to which no destaged data can be further assigned; and being garbage collected, GC, which refers to a closed segment that is currently being garbage collected, as discussed hereinbelow. A closed segment consists of 'live' LTs and 'holes'. The former are LTs that were assigned to the segment during the segment's open phase and still reside in the segment. The latter is space vacated by LTs that were assigned to the segment but have subsequently been updated and assigned to different open segments. A closed segment's occupancy is the sum of the lengths of the segment's live tracks.

A destage operation provides for the LTs in a logical cylinder to be destaged together from a cache within the storage subsystem to a storage device to enhance the seek affinity of sequential accesses. A logical cylinder is typically called a neighborhood, and a group of logical tracks in a logical cylinder destaged together is called a neighborhood in destage (NID) or neighborhood destage request. Destaging a neighborhood essentially involves the following steps:

1. The neighborhood in destage is assigned to an open segment.

2. An open segment remains available to accept other neighborhoods in destage until it is deemed full enough to close in accordance with a desired algorithm.

3. The data and parity of the segment is written to disk before the segment is considered closed.

4. Each LT in the open segment has an entry in the segment directory that describe the LT's location in the segment. The segment directory is written on disk, as part of the segment.

An LT in a closed segment may be updated and destaged again, at which time it is assigned to another open segment. This causes the previous copy of the LT to become obsolete, thus forming a 'hole' in the closed segment. Garbage collection (GC) is the process of reclaiming 'holes' in closed segments. GC is started when the number of free segments falls below a certain threshold.

The process of garbage collecting a segment involves reading the segment's directory from disk, then scanning each segment directory entry and comparing the LT's address as indicated by the segment directory entry with the address as indicated by the LSA directory entry. If the two entries match, then the LT still resides in the segment and is considered 'live'. All the live LTs are then read from disk into memory and sorted by neighborhood. These neighborhoods in destage then proceed to be destaged in the same manner as described above. These NIDs are assigned to open segments; when such open segments close successfully, the NIDs are garbage collected, thus decreasing the occupancy of the segments in which the NIDs previously resided. When a segment's occupancy declines to zero, either as a result of garbage collection or as a result of movement of tracks from normal destage activity, the segment becomes free.

The following problem exists during concurrent garbage collection and destaging. The process of garbage collecting a segment requires that at least one free segment exists in order to serve as the new home for live logical tracks being moved from the garbage collected segment. If no free segments are available to hold garbage collected LTs, then a deadlock may occur: future destage operations stall because there are no free segments to hold LTs that are destaged; only the GC process can produce free segments, since segments can no longer become empty through the movement of updated LTs to new segments; however, the GC process cannot proceed without a free segment. A remote possibility exists that LTs newly assigned to open segments at the time the LSA exhausts its supply of free segments will free one or more segments when those open segments eventually close and the NIDs are destaged. However reliance on this possibility does not ensure the correct functioning of the log-structured system.

Accordingly, a need exists for a method and system of preventing deadlock during garbage collection in a log structured array. The present invention addresses such a need.

SUMMARY OF THE INVENTION

The present invention provides aspects for preventing deadlock in a log structured array. In an exemplary method aspect, and system for providing same, the method includes monitoring available segments to determine when to reserve an open segment, identifying a process type requesting access to the open segment, and limiting access to one process type for a reserved segment. Limiting access further includes limiting access to a garbage collection process.

Through the present invention, stalls of destage operations are avoided by eliminating deadlocks that can occur because of contention over free segments between garbage collection and destage processes. Control of a last free segment for exclusive use by a garbage collection process effectively maintains production of free segments via garbage collection techniques. These and other advantages of the aspects of the present invention will be more fully understood in conjunction with the following detailed description and accompanying drawings.

DETAILED DESCRIPTION OF THE INVENTION

The present invention relates to preventing deadlock during garage collection in a storage subsystem arranged as a log structured array. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
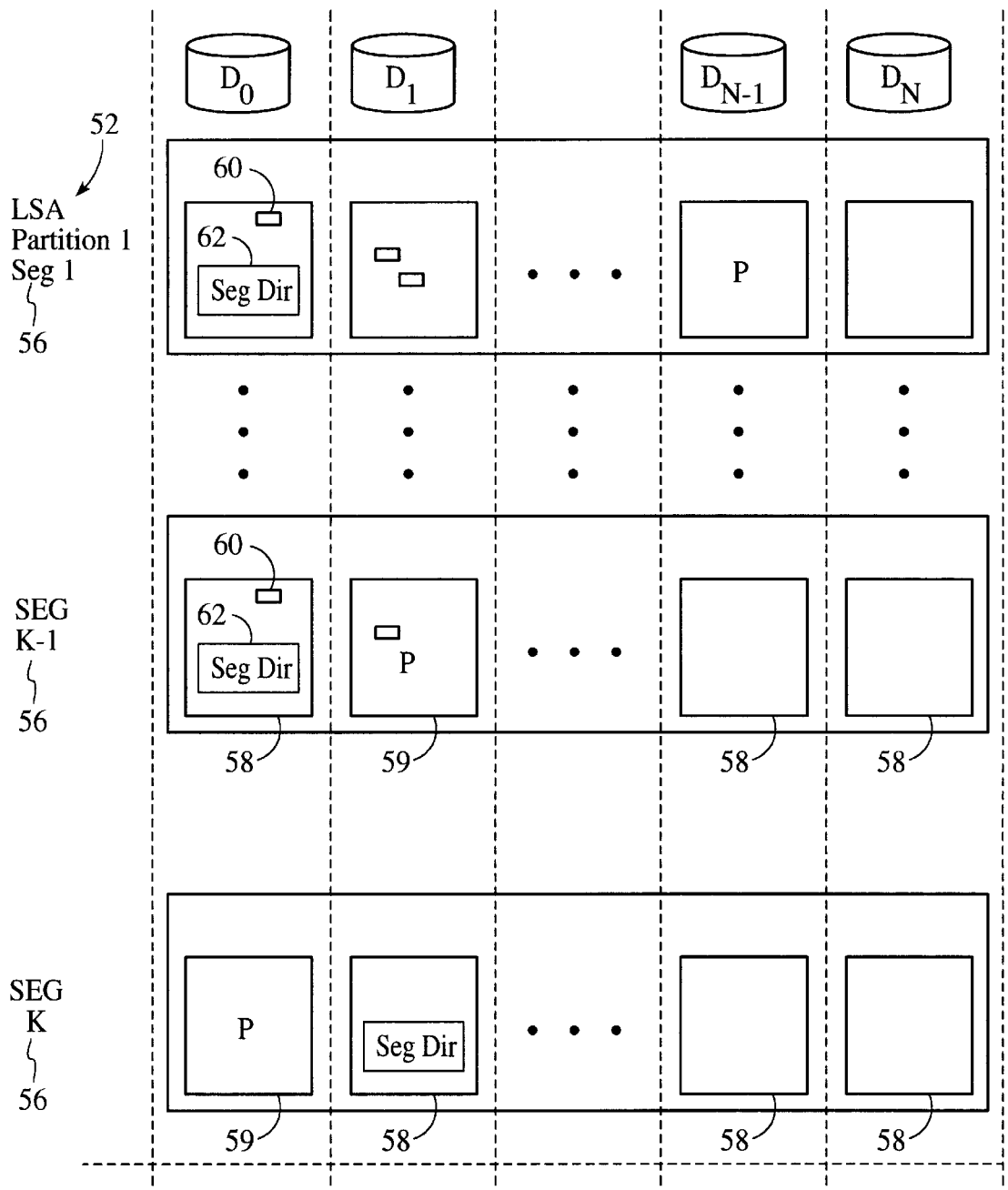
FIG. 1 illustrates an example of an LSA layout.
Figure 2:
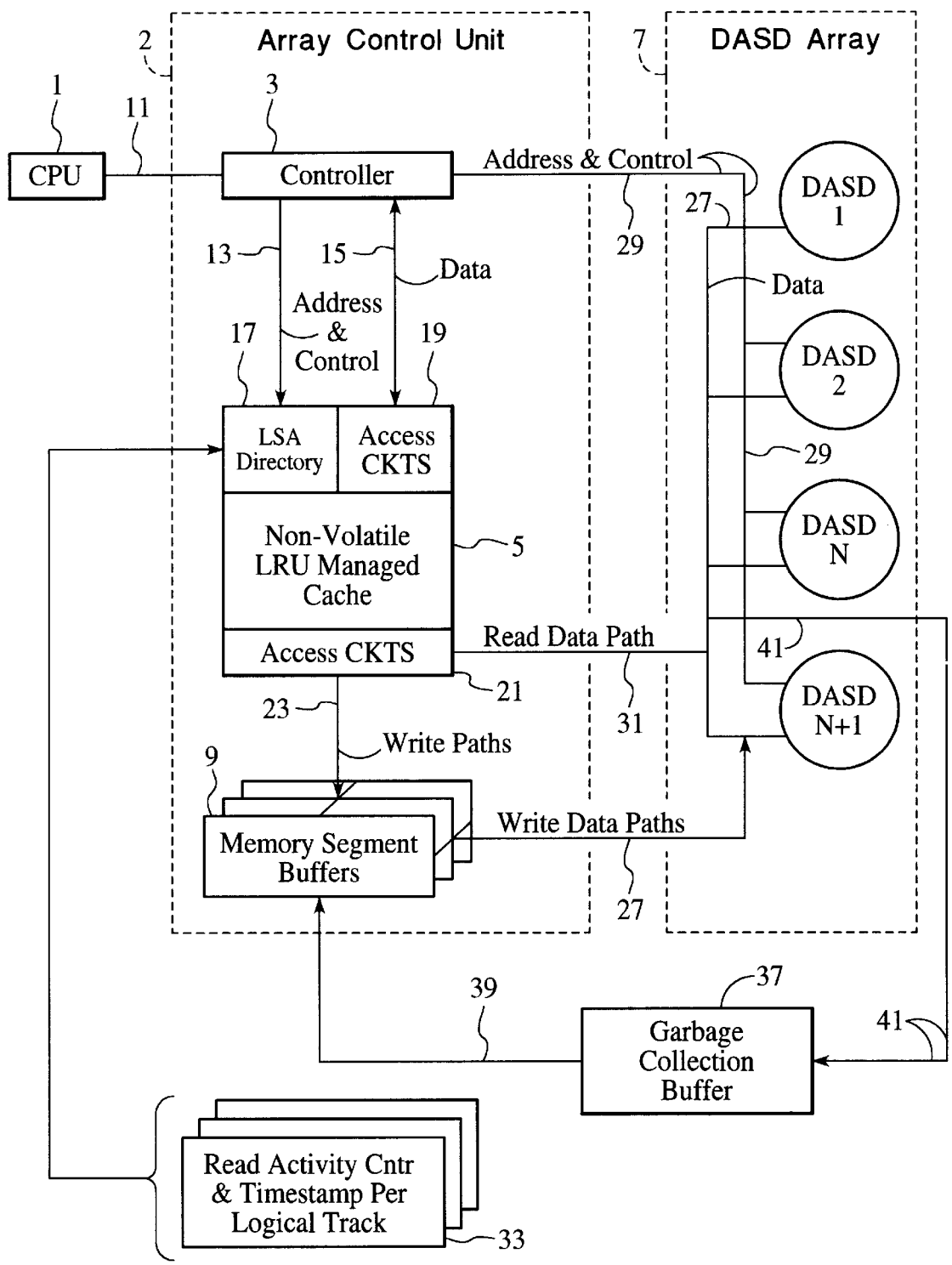
FIGS. 2 illustrates a cache oriented buffered DASD array system in accordance with the present invention.

Referring now to FIG. 2, there is shown a system including a host processor 1, and an external store. The external store is formed from an array 7 of groups of N+1 DASDs, and an array control unit 2 coupling the processor 1 to the array 7. Processor 1 preferably comprises at least one or more processors used to execute application and system code; memory to hold application code, system code, and data; and means responsive to read and write calls from executing applications for accessing information not otherwise in memory from the external store through the system code (otherwise termed an operating system such as MVS, AIX, CICS, etc.)

Typically, as described in Luiz et al., U.S. Pat. No. 4,207,609, "Method and Means for Path Independent Device Reservation and Reconnection in a Multi-CPU and Shared Device Access System", issued Jun. 10, 1980, and the references cited therein, there is shown an architecture for establishing an access path to data by which a processor host or CPU obtains variable or fixed length records from an attached DASD storage subsystem.

Under this architecture, the CPU creates a dedicated virtual processor for accessing and transferring data streams over demand/response interfaces to attached subsystems using chains of special purpose I/O instructions termed "channel command words" or CCWs. The CCWs are stored in a portion of CPU main memory in support of fast calls. When an application program executes a read or write requiring access to external storage (usually attached DASD storage), then, for example, the CPU S/370 MVS operating system initiates such a reference with a START I/O command. This 20 command causes the CPU to suspend its multi-processing state, transfer to the CCW chain, and re-establish its prior state after CCW chain completion.

Referring again to FIG. 2, processor 1 sends an appropriate CCW chain to controller 3 over path 11. Controller 3 'interprets' each of the CCW's and responsively applies counterpart control and address signals over path 13 to LSA directory 17 to ascertain location of data. Data is transferred between host processor 1 and array 7 in the read direction over a path including read data path 31, access circuits 21, cache 5, access circuits 19, path 15, and controller 3. Data is transferred in the write direction over a path including controller 3, access circuits 19, cache 5, access circuits 21, accumulating memory segment buffer 9 and write path 27.

Controller 3 comprises one or more microprocessors with sufficient associated local memory for storing software for interpreting the CCWs and managing the cache 5 and the DASD array 7 according to the LSA storage model of this invention, including managing control of utilization of free segments to avoid deadlocks during garbage collection and destaging. DASD array 7 may be managed by controller 3 as a RAID 3 or RAID 5 array, as is well understood by those skilled in the art.

Array control unit 2 includes a large, non-volatile (NV) cache memory 5 and memory segment buffers 9 formed from a plurality of segment column sized buffers. The NV cache 5 holds both updated LTs received from the host CPU 1 and clean LTs read from DASD array 7. Cache 5 is managed in the traditional LRU fashion. That is, cache 5 contains clean LTs organized in one LRU list and modified (dirty) LTs organized in another LRU list. The fraction of cache occupied by modified LTs is monitored by the controller 3. When this fraction exceeds some threshold, some number of modified LTs are assigned to one of the memory segment buffers 9. After a segment's worth of LTs are stored in buffer 9, they are written into contiguous sectors on the devices in the DASD array 7. When cache memory is needed to hold new LTs read from DASD, or new LTs received from the host system, LRU clean LTs can be overwritten in cache 5.

The buffering aspect of cache 5 permits delay in writing modified logical tracks to one of the memory segment buffers 9 and then to the DASD array 7. This delay can be advantageously employed to minimize any loss of seek affinity. If other writes to adjacent LTs are received into the cache 5 from the system (controller 3) before the first LT is selected for pushing out from cache 5 to one of the memory segment buffers 9, then all logically adjacent modified tracks can be pushed out at the same time into the same memory segment column of the memory segment buffer. Thus if adjacent LTs are modified within some window of time proportional to the size of cache 5, they will likely be placed contiguously on DASD, and no seek affinity will be lost.

The cache 5 is operated according to the following constraints:

(1) When the fraction of cache space occupied by modified LTs exceeds a threshold, a modified LRU LT and logically adjacent LTs are pushed from the cache 5 to one of the memory segment buffers 9, preferably to a single memory segment-column.

That is, if there are at least c (e.g., c=2) adjacent clean LTs in cache 5 at this time, then the adjacent clean LTs should likewise be pushed out to the same memory segment column buffer 9 as well.

(2) Shortly before the space containing an LRU clean LT is scheduled for reuse, ascertain whether at least m (e.g., m=1) logically adjacent clean LTs are in cache 5 and are not currently stored physically contiguously on DASD disk. If such LTs are found, push the LRU clean LT and all adjacent clean and modified LTs to one of the memory segment buffers 9, preferably in the same memory segment-column.

The term "logically adjacent tracks" refers to LTs which reside in the same "neighborhood". For this purpose, a "neighborhood" is defined as an ordered set of logical tracks. It follows that "adjacent neighborhoods" are those in which the first k logical tracks are in neighborhood 1, the second k logical tracks are in neighborhood 2, and so on. Thus, for example, a neighborhood consisting of k=15 logical tracks can form a logical cylinder on a typical logical DASD storage device.

LTs being garbage collected are read and placed in a garbage collection buffer 37 over a path from array 7 and line 41. The collected LTs are sorted by track number and accumulated into neighborhoods, which are then destaged. Like NIDs originating from cache, each GC NID is placed entirely in a single segment column of the segment if possible. When a segment fills buffer 9, it is written to DASD array 7 over write data path 27.

Figure 3:
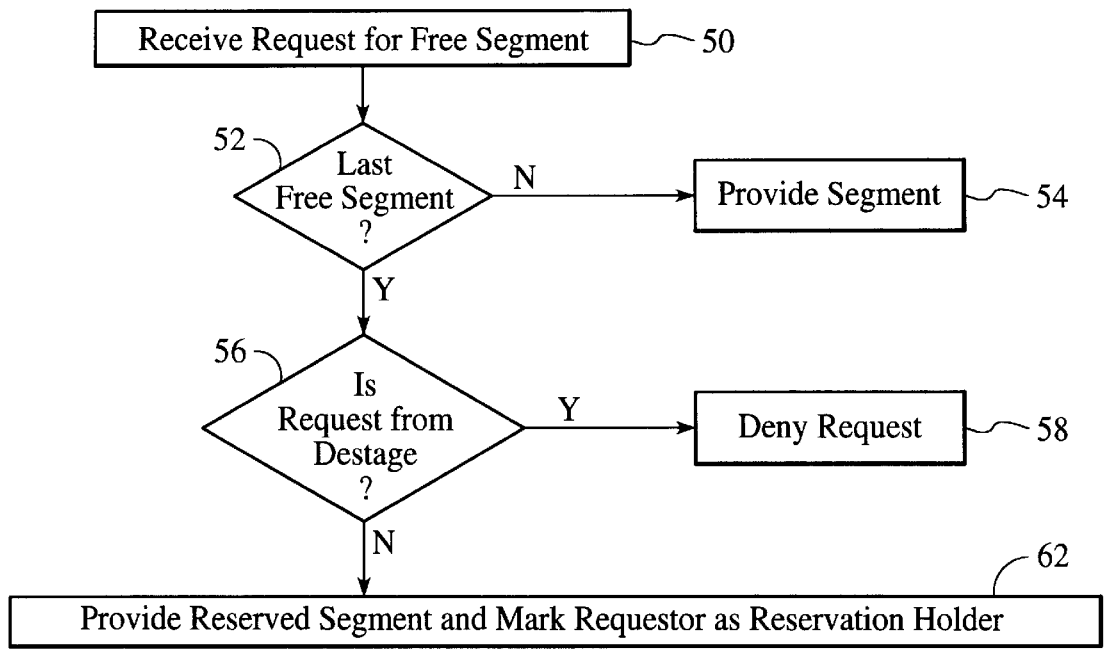
FIG. 3 illustrates a process for preventing deadlock by controlling free segment allocation during garbage collection of the system of FIG. 1.

Thus, the process of garbage collecting is utilized to help free segments. In accordance with the present invention, improved garbage collection control by the controller 3 of the array controller 2 effectively prevents deadlocks during garbage collection, where both destage operations and garbage collection processes obtain free segments from the same segment pool. Referring to FIG. 3, deadlock prevention is invoked on receipt of a request for opening a free segment for garbage collection or destage (step 50). Preferably, open segments are distinguished as either destage open segments, which hold only NIDs originating from cache, or GC open segments, which hold only live logical tracks from segments being garbage collected. A determination is made to identify whether there exists a free segment in the segment pool that is not the last free segment, i.e., a reserved segment, (step 52), where the number of free segments in the segment pool is tracked by a suitable internal counter mechanism. When there is a free segment that is not the last free segment in the segment pool, the free segment is provided to the requesting process (step 54).

When only the reserved segment is available in the segment pool, the process continues by determining whether the request is from a destage operation (step 56). When the request is from a destage operation, the request is denied (step 58), e.g., by an internal error signal, to keep the reserved segment from being used in destaging. When the request is not from a destage operation, and thus is from a garbage collection process, the garbage collection process requesting the free segment is designated (step 60). Thus, a reservation holder refers to a particular segment being garbage collected that was the first segment to have a live LT assigned to the open GC segment now reserved.

With the use of a reservation holder, the handling of the reserved segment is carefully done to thus solve the following deadlock problem. Many closed segments may be chosen to be garbage collected at once. The live LTs from these 'N' GC segments are assigned to 'M' GC open segments. Thus, a GC open segment may contain LTs from several GC segments. This condition may pose a problem when the reserved segment becomes the last GC open segment: if the reserved segment accepts LTs from multiple GC segments, it may not be able to accommodate all the live LTs from any single GC segment. A deadlock ensues, as the free segment pool is exhausted, and no more free segments can be produced, since none of the segments undergoing garbage collection can empty itself completely. Thus, the last free segment is reserved not only for a GC process, but specifically for a single reservation holder. All remaining live logical tracks from that particular GC segment that have yet to be assigned to an open segment are assigned to either the reserved segment or any previously opened segment for garbage collection.

Through the present invention, successful utilization of control over free segments avoids potential deadlock problems during destage and garbage collection. In achieving the control, consideration to the order in which live LTs from the reservation holder are assigned is also made. For example, consider a segment being garbage collected that has two 25-sector data segment columns. Assume that three live LTs belong to different neighborhoods: one, LT 0, in a segment column 0 having 10 sectors; one, LT 25, in segment column 0, having 10 sectors; and one, LT 99, in segment column 1, having 23 sectors. If, when the three live LTs are assigned to the reserved segment, LT 0 is assigned to a different segment column than LT 25, then LT 99 will not fit into that segment. In that case, even though the reserved segment is solely used by the reservation holder, it cannot hold all the live slots from that segment being garbage collected. Therefore, that segment still cannot be freed while the reserved segment is exhausted, and deadlock occurs again. Thus, if any two live logical tracks from the same segment column in the reservation holder are assigned to the reserved segment, then, those logical tracks reside in the same segment column of the reserved segment. This substantially guarantees that at least the reservation holder will be freed.

Figure 4:
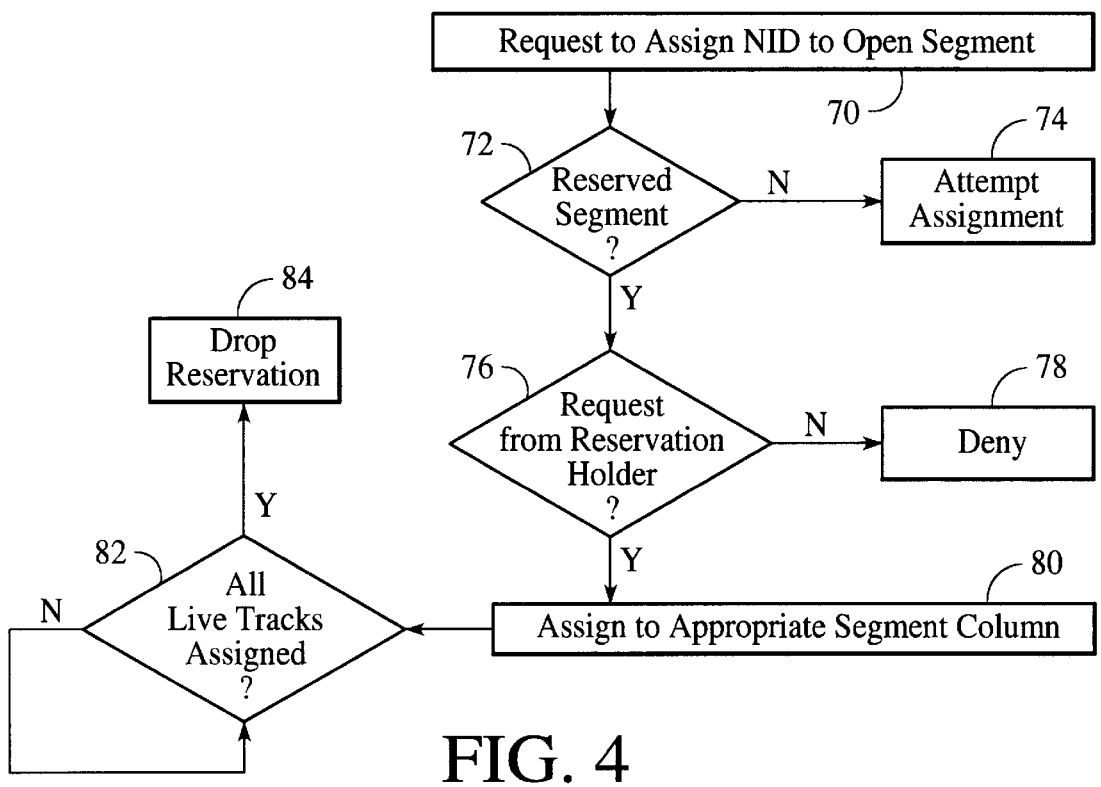
FIG. 4 illustrates a process for assigning a NID to an open segment in accordance with the present invention.

Referring now to FIG. 4, a method for assigning NID's to open segments is presented. The method initiates with a request for assignment of an NID to an open segment (step 70). A determination then occurs to identify if the open segment is the reserved segment (step 72). If the open segment is not the reserved segment, an attempt to assign the NID to the open segment is made (step 74). When the open segment is the reserved segment, a determination of whether the request is from the reservation holder follows (step 76). If the request is not from the reservation holder, the request is denied (step 78). If the request is from the reservation holder, the NID is assigned to the appropriate segment column (step 80). Once all the live LTs in the reservation holder have been assigned, as determined via step 82, the reservation is dropped by the reservation holder (step 84).

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for preventing deadlock in a log structured array, the method comprising:

monitoring available segments to determine when to reserve an open segment;

identifying a process type requesting access to the open segment; and limiting access to a reservation holder segment of garbage collection process for the reserved segment, a reservation holder segment further comprising a segment being garbage collected that was a first segment to have a live logical track assigned to the reserved segment.

2. The method of claim 1 wherein a reserved segment comprises a last free segment.

3. The method of claim 1 further comprising providing equal access to a free segment pool, except for a last free segment, to a destage operation and garbage collection process when obtaining a new open segment.

4. A method for preventing deadlock in a log structured array, the method comprising:

monitoring available segments to determine when to reserve an open segment;

identifying a process type requesting access to the open segment; and limiting access to a reservation holder segment of garbage collection process for the reserved segment, wherein when the reservation holder has had all live logical tracks assigned, the reserved segment is available to another garbage collection process.

5. A cache oriented buffered DASD array system with segment deadlock prevention, the system comprising:

a processor;

an array control unit coupled to the processor, the array control unit including a cache and a controller for monitoring available segments to determine whether an open segment is a reserved segment, identifying a process type requesting access to the open segment, and limiting access to a garbage collection process acting as a reservation holder on the reserved segment, wherein the reservation holder further comprises a segment being garbage collected that was a first segment to have a live logical track assigned to the reserved segment; and a storage subsystem coupled to the array control unit for storing data from the cache in accordance with the array control unit.

6. The system of claim 5 wherein a reserved segment comprises a last free segment.

7. The system of claim 5 wherein the array control unit further provides equal access to a free segment pool, except for a last free segment, to a destage operation and garbage collection process when obtaining a new open segment.

8. A cache oriented buffered DASD array system with segment deadlock prevention, the system comprising:

a processor;

an array control unit coupled to the processor, the array control unit including a cache and a controller for monitoring available segments to determine whether an open segment is a reserved segment, identifying a process type requesting access to the open segment, and limiting access to a garbage collection process acting as a reservation holder on the reserved segment, wherein when the reservation holder has had all live logical tracks assigned, the reserved segment is available to another garbage collection process; and a storage subsystem coupled to the array control unit for storing data from the cache in accordance with the array control unit.

9. A method for preventing deadlock in a log structured array during garbage collection and destaging of data, the method comprising:

receiving a request for opening of a free segment;

identifying whether a free segment is available that is not a last free segment;

determining whether the request is from a destage operation when there is only the last free segment;

providing the last free segment when the request is not from the destage operation;

determining whether a garbage collection process making a request to assign logical tracks to an open segment is a garbage collection process having a reservation holder for the last free segment, and providing access to the last free segment when the request is from the reservation holder; and determining whether all live logical tracks from the reservation holder have been appropriately assigned when the request is not from the reservation holder, and accepting any live logical tracks from any other segments being garbage collected when all live logical tracks from the reservation holder have been assigned.

10. The method of claim 9 further comprising providing the free segment when the free segment is not identified as the last free segment.

11. The method of claim 9 further comprising denying the request when the request is from a destage operation and there is only the last free segment.

12. The method of claim 9 further comprising denying the request when all live logical tracks from the reservation holder have not been assigned.

13. A method for preventing deadlock in a log structured array during garbage collection and destaging of data, the method comprising:

receiving a request for opening of a free segment;

identifying whether a free segment is available that is not a last free segment;

determining whether the request is from a destage operation when there is only the last free segment;

providing the last free segment when the request is not from the destage operation;

determining whether a garbage collection process making a request to assign logical tracks to an open segment is a garbage collection process having a reservation holder for the last free segment, and providing access to the last free segment when the request is from the reservation holder; and assigning live logical tracks from a same segment column in a segment being garbage collected to a same segment column in the last free segment when the logical tracks are from the reservation holder.

* * * * *